(12) United States Patent
Melville, II et al.

(10) Patent No.: US 6,377,214 B1
(45) Date of Patent: Apr. 23, 2002

(54) PIPELINED PROCESSING ALGORITHM FOR INTERFEROMETER ANGLE OF ARRIVAL ESTIMATION

(75) Inventors: John G. Melville, II, Ramona; David D. Feldman, Los Angeles, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/633,162

(22) Filed: Aug. 4, 2000

(51) Int. Cl.[7] .................................. G01S 5/04
(52) U.S. Cl. ................. 342/442; 342/445; 342/156
(58) Field of Search .................... 342/442, 445, 342/446, 156

(56) References Cited

U.S. PATENT DOCUMENTS

| | | | |
|---|---|---|---|
| 3,633,205 A | * | 1/1972 | Lee et al. |
| 4,541,687 A | | 9/1985 | Brooks |
| 4,638,321 A | | 1/1987 | Drogin |
| 4,809,012 A | | 2/1989 | Tong |
| 4,977,365 A | | 12/1990 | Tsui et al. |
| 5,061,064 A | | 10/1991 | Morand et al. |
| 5,381,150 A | | 1/1995 | Hawkins et al. |
| 5,451,956 A | | 9/1995 | Lochhead |
| 5,457,466 A | * | 10/1995 | Rose .......................... 342/442 |
| 5,497,161 A | | 3/1996 | Tsui |
| 5,568,154 A | | 10/1996 | Cohen |
| 5,572,213 A | | 11/1996 | Noneman et al. |
| 5,572,220 A | | 11/1996 | Cai |
| 5,657,027 A | | 8/1997 | Guymon, II |
| 5,691,728 A | | 11/1997 | Goetz et al. |

OTHER PUBLICATIONS

A. Miyoshi, H. Kobayashi "Estimation of angle of arrival for wideband and coherent signals" SPIE vol. 3086, 0277–786X/97, pp. 106–171.

* cited by examiner

Primary Examiner—Theodore M. Blum
(74) Attorney, Agent, or Firm—Katten, Muchin Zavis

(57) ABSTRACT

This disclosure describes an electronic support measures (ESM) system for estimating the angle of arrival of a signal which impinges on an array of antennas configured in a straight line. The antennas in the array are spaced such that the distances from the interior antennas to one of the end antennas—in terms of units of a reference length $\xi$—are relatively prime. The system does not require a priori knowledge of the signal radio frequency. In order to enhance the computational efficiency and ability of the system, a Diophantine processing algorithm is utilized. The set of antenna spacings is selected based upon minimizing the probability that this algorithm produces an ambiguity error in the estimated angle of arrival. The computational efficiency of the system is improved relative to current systems, as it requires only $N^2$ real multiplications, where $N+1$ is the number of antennas in the array. The required $N^2$ real multiplications can be realized in non-interacting pipelined parallel paths, leading to reduced latency of angle estimation. As such, the ESM system in accordance with the present invention is adapted to be used in various avionics applications that were heretofore beyond the computational processing ability of known systems.

10 Claims, 4 Drawing Sheets

US 6,377,214 B1

PIPELINED PROCESSING ALGORITHM FOR INTERFEROMETER ANGLE OF ARRIVAL ESTIMATION

BACKGROUND OF THE INVENTION

1. Field of the Invention

The present invention relates to an electronic warfare system and more particularly to a linear one-dimensional interferometer array and processing system for computing the angle of arrival of intercepted pulses, for example, radar pulses, for determining the location of the pulse emitter for targeting purposes; the system being more computationally and/or memory efficient than known systems.

2. Description of the Prior Art

Various electronic warfare systems are known in the art. Such electronic warfare systems are used in various applications including detecting the location of, for example, enemy radar devices. More particularly, such electronic warfare systems, also known as electronic support measures (ESM) systems, normally include a plurality of antennas configured in a linear one-dimensional array. These antennas are normally connected to one or more receivers, which, in turn, are connected to processing hardware for computing the angle of arrival of intercepted enemy radar pulses, for example. The processing hardware utilizes the phase differences of the intercepted pulses to determine their angle of arrival. The angle of arrival information allows the location of the enemy radar system to be ascertained. Such information may then be used for targeting the enemy radar system.

Examples of systems for computing the angle of arrival, for example, of radar pulses, are described in detail in U.S. Pat. Nos. 4,638,321; 4,977,635; 5,061,064; 5,497,161; 5,572,220; and 5,657,027, hereby incorporated by reference. Such systems are also disclosed in commonly owned U.S. Pat. Nos. 5,381,150; 5,451,956 and 5,572,213.

The phase difference between one antenna and another is not a monotonic function of the angle of arrival because the phase measurements are restricted to the $2\pi$ interval between $-\pi$ and $\pi$. Roll-overs (multiples of $+/-2\pi$) account for the difference between the "ideal phase difference" (which does increase monotonically with increasing angle of arrival) and the measured phase difference. Thus, for example, an ideal phase value slightly larger than $3\pi$ rolls over to a measured phase value slightly larger than $-\pi$. Some known systems estimate the angle of arrival by "comparing" the vector of the measured phase differences between all the antennas with a set of hypothetical (i.e., noiseless) phase a difference vectors corresponding to different possible angles of arrival. To obtain an accurate estimate, many possible angles of arrival must be considered, and hence many "comparisons" must be made, requiring considerable computation or memory. Such known systems are thus too processor-intensive for use in a real-time pulse sorting/detection environment.

Circumstances in which the transmitting source characteristics change rapidly relative to the array (e.g., when the source is frequency-hopping or moving or when the array is moving in an unknown manner), or in which the source is rarely transmitting, cause additional problems for such known systems. In particular, known systems which require large amounts of data to estimate the angle of arrival would be at a disadvantage in such application, either because the data characteristics would significantly change during the time the data was being collected if the source characteristics were changing rapidly, or because a large amount of time would be required to collect the data if the source were rarely transmitting.

SUMMARY OF THE INVENTION

Briefly, the present invention relates to an electronic support measures (ESM) system which includes a plurality of antennas configured in a linear array forming a linear one-dimensional interferometer. The N+1 antennas in the array are spaced at locations $0, \xi d_1, \ldots, \xi d_N$ in terms of units of a reference length $\xi$–where $d_1, \ldots, d_{N-1}$ are relatively prime numbers (i.e. numbers in which the largest common divisor is one) and $d_i, d_N$ is relatively prime for some i in the range $1 \leq i < N$. In order to enhance the computational efficiency and ability of the system, a Diophantine processing algorithm is utilized which is based on resolving the number of phase roll-overs. In particular, the method in accordance with the present invention for estimating the angle of arrival is based on determining the number of $2\pi$ roll-overs which resulted in the measured phase difference between the reference antenna and some other antenna in the array, e.g., the antenna furthest away from the reference antenna. The present invention thus avoids comparisons to a table of hypothetical phase vectors as is done by known systems, directly solving for the angle of arrival after determining the number of phase roll-overs, and is thus suitable as an electronic warfare system in applications currently beyond the capability of known systems. The computational efficiency of the system is thus relatively improved and requires only $N^2$ real multiplications, where N+1 is the number of antennas in the array. As such, the ESM system is relatively more efficient and requires reduced computation and/or memory relative to known systems. In addition, the ESM system in accordance with the present invention is particularly suitable to be used in various avionics applications that were heretofore known to be beyond the computational processing ability of known systems, for example, in applications in which the transmitting source characteristics change rapidly relative to the array or in which the source is rarely transmitting.

DESCRIPTION OF THE DRAWINGS

These and other advantages of the present invention will be readily understood with reference to the following specification and attached drawing wherein.

DETAILED DESCRIPTION

The present invention relates to an electronic warfare system and more particularly to an electronic support measure (ESM) system which reduces the computational and/or memory requirements needed to accurately estimate the angle of arrival of an intercepted radar pulse or other pulse signals. The system includes a reference antenna and N additional antennas configured in a linear array forming a linear one-dimensional N+1-element interferometer. Although N is described below and illustrated as four, the principles of the present invention are not so limited and are essentially applicable to any number N of additional antennas. In accordance with one aspect of the invention, the antenna elements are spaced at locations $0, \xi d_1, \ldots, \xi d_N$ in terms of units of a reference length $\xi$ where $d_1, \ldots, d_{N-1}$ are relatively prime (i.e numbers whose largest common divisor is one) and $d_i, d_N$ is relatively prime for some i in the range $1 \leq i < N$. The system utilizes a Diophantine processing algorithm that is based upon resolving the number of phase roll-overs and requires only $N^2$ real multiplications, where N is the number of antennas in the array not including the reference antenna.

Figure 1A:
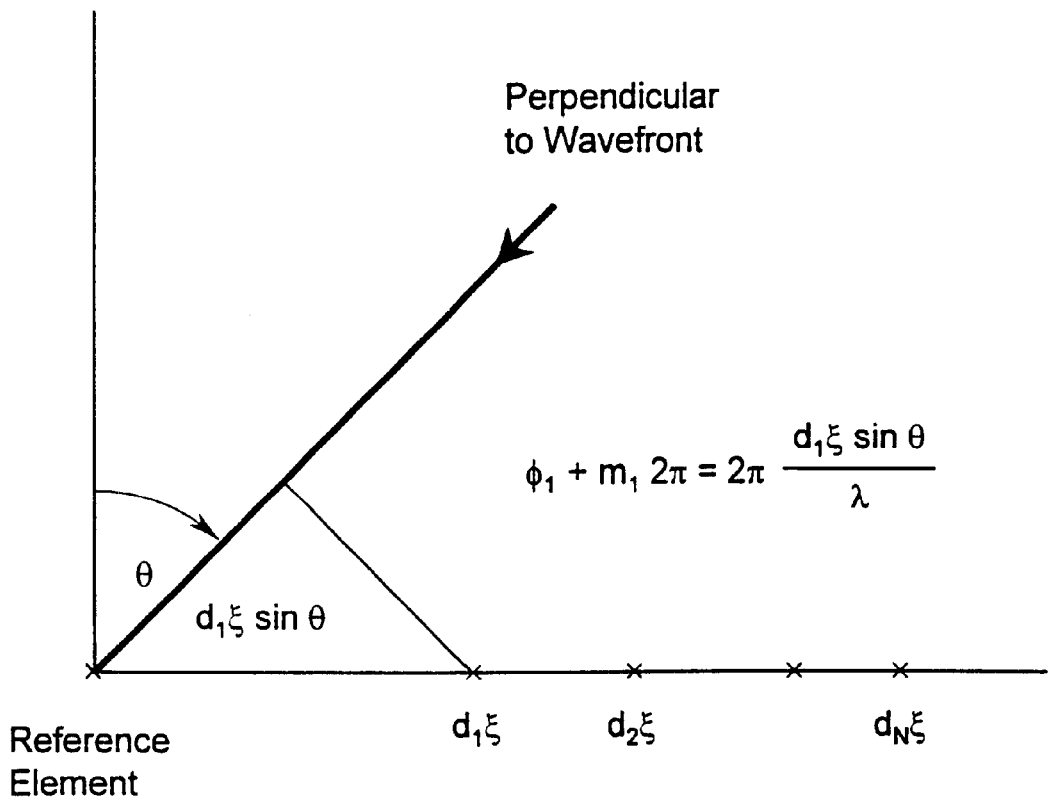
FIG. 1a is a graphical illustration of a linear array of N+1 antennas which illustrates the relationship between the wavelength ($\lambda$), the angle of arrival ($\eta$), the roll-over associated with antenna 1 ($m_1$), and the phase difference at antenna 1 ($\phi_1$) produced by an intercepted pulse.

Thus, for the system illustrated in FIG. 1, only 16 real multiplications are necessary to compute the angle of arrival of intercepted pulses. The computational and/or memory efficiency of the system in accordance with the present invention allows the system to be used in various applications that heretofore were beyond the processing capability of known systems. Such applications include, for example, applications in which a dense pulse environment is analyzed for pattern detection.

The system in accordance with the present invention may be implemented in hardware, in software running on a microprocessor, or in a combination of hardware and software. All such implementations are intended to be within the broad scope of the appended claims. One hardware implementation may include an application specific integrated circuit (ASIC). In such an implementation, the ASIC may be formed from 100,000 gates and clocked at 10 MHz. For such an implementation, 15 clock cycles or 1.5 microseconds are required to obtain an estimated angle, which is fast enough to enable real time sorting/blocking of pulses in a signal collection environment.

The present invention relates to a linear array consisting of N+1 antennas. The coordinates of the antennas are $0, \xi d_i, \ldots, \xi d_N$, where $\xi$ is a reference length not exceeding a half-wavelength ($\lambda/2$) at the maximum frequency of operation and $d_i$ is a dimensionless integer for all i. In accordance with the present invention the set of N-1 numbers $\{d_i, d_2, \ldots, d_{N-1}\}$ are relatively prime and $\{d_i, d_N\}$ is relatively prime for some i in the range $1 \leq i < N$.

If a plane wave of wavelength $\xi$ with an angle of arrival (AOA) $\theta$ (also referred to as the azimuth) impinges on the array, the phase shift $\phi_i$ between the $i^{th}$ and $0^{th}$ element satisfies the following relationship as set forth in equation (1) below:

$$\phi_i + m_i 2\pi = \frac{\xi d_i}{\lambda} 2\pi \sin(\theta), \quad (1)$$

where $m_i$ is an integer roll-over, $-\pi <= \phi_i < \pi$, $1 <= i <= N$, and $\theta$ is assumed to satisfy the constraint: $-\pi/2 < \theta < \pi/2$.

While the phase shifts $\phi_i$ can be measured, the roll-overs $m_i$ and the angle of arrival $\theta$ are unknown.

In accordance with the present invention, a Diophantine algorithm is used that is based upon a single noisy snapshot (observation). Diophantine computations are discussed in detail in *Number Theory and Its History*, by Oystein Ore, Dover Publications Inc., New York, 1988, hereby incorporated by reference. The algorithm first estimates the roll-over $m_N$ corresponding to the largest baseline $d_N$ and uses that estimate to derive an estimate for the angle of arrival $\theta$. Note that although finding the roll-over associated with the largest baseline is discussed, it is possible to find the roll-overs associated with all the other baselines in a similar manner. Using the different roll-overs would lead to different estimates of the same angle-of-arrival. These estimates could be combined using weighted averaging to obtain a single improved estimate. Thus, the present invention contemplates the possibility of determining more than one roll-over.

Let A denote an N-1 by N matrix with integer-valued elements satisfying the relationship set forth in Equation (2) below:

$$Ad=0 \quad (2)$$

where d is provided in equation (3):

$$d^{def} = \begin{bmatrix} d_1 \\ \vdots \\ d_N \end{bmatrix} \quad (3)$$

and 0 denotes a vector of zeros. It will be demonstrated that such an A matrix exists, given the assumptions that $\{d_1, d_2, \ldots, d_{N-1}\}$ are relatively prime and that $\{d_i, d_N\}$ is relatively prime for at least one i in the range $1<=i<N$. This second condition, although used in the existence proof which follows, is not in general a necessary condition for the existence of A. The matrix A and vector d can be partitioned as shown in equations (4) and (5) where B is an N-1 by N-1 matrix, e and $\bar{d}$ are column vectors of dimension N-1.

$$A=[Be] \quad (4)$$

and $$d = \begin{bmatrix} \bar{d} \\ d_N \end{bmatrix} \quad (5)$$

As will be shown, the algorithm makes use of the fact that $B^{-1}$ exists and that $$|B|=-d_N, \quad (6)$$

where $|B|$ denotes the determinant of B.

As long as $d_i$ and $d_N$ are relatively prime for some $i \in \{1, \ldots, N-1\}$, A and B satisfying equations (2), (4) and (6) can always be found, as demonstrated through the following constructive proof.

This constructive proof is provided for the case of N=4, but is readily generalizable to arbitrary N. Assuming A is chosen as set forth in equation (7)

$$A = \begin{bmatrix} d_4 & 0 & 0 & -d_1 \\ 0 & d_4 & 0 & -d_2 \\ 0 & 0 & d_4 & d_3 \end{bmatrix} \quad (7)$$

Equation (2) is satisfied, but $$|B|=d_4^3 \quad (8)$$

For notational convenience, let $d_1$ and $d_4$ constitute the relatively prime pair required by the proof. Because the pair is relatively prime, there exist integers m and n such that $$md_1+nd_4=1, \quad (9)$$

so $$-d_2 m(-d_1)-d_2=-d_2 n d_4. \quad (10)$$

Thus, a multiple $-d_2m$ of the first row of A can be added to the second row to obtain a new row, all of whose elements are multiples of $d_4$. Because adding a multiple of one row to another does not alter the determinant, after factoring $d_4$ from the modified second row, the new determinant is $d_4^2$. Similarly modifying the third row reduces the determinant to $d_4$, after which we can replace one of the rows with its negative to change the sign of the determinant.

As the first step in establishing an equivalency between the requirement in Equation (6) and two assumptions which will be made, substitute Equations (4) and (5) into Equation (2) to obtain $$B\bar{d}+ed_N=0, \tag{11}$$

from which it follows that $$\bar{d}=-B^{-1}ed_n. \tag{12}$$

In terms of its adjoint matrix, $B_{adj}$, and determinant, $|B|$, the inverse of B can be expressed as $$B^{-1} = \frac{B_{adj}}{|B|}, \tag{13}$$

so Equation 12 can be rewritten as $$\bar{d} = -\frac{B_{adj}}{|B|}ed_N. \tag{14}$$

Note that because B has integer values, $B_{adj}$ does as well. Recalling that $|B|=-d_N$, Equation 14 can be rewritten as follows:

$$\bar{d}=B_{adj}e \tag{15}$$

Note that because of the assumption that $\{d_1, d_2 \ldots d_{N-1}\}$ are relatively prime, there exists an integer-valued column vector h satisfying $h^T\bar{d}=1$, where $^T$ denotes the transpose operator. Thus, $$h^T B_{adj} e = 1. \tag{16}$$

To further the exposition of this algorithm, let the vectors $\phi$, $\bar{\phi}$, m, and $\bar{m}$ be defined in terms of the quantities $\{\phi_i, i=1, \ldots, N\}$ and $\{m_i, i=1, \ldots, N\}$, analogously to the definitions of d and $\bar{d}$. Using this notation, Equation (1) becomes $$\phi + m2\pi = \frac{\xi}{\lambda} 2\pi \sin(\theta) d. \tag{17}$$

Multiplying both sides of this equation by A, applying (2), and rearranging terms yields $$n^{def} = \frac{1}{2\pi} A\phi \tag{18}$$

$$=Am. \tag{19}$$

Thus, $$n+Am=0. \tag{20}$$

Equivalently, using equation (4) and writing m in terms of its partition quantities $\bar{m}$ and $m_N$, we have $$n+B\bar{m}+em_N=0. \tag{21}$$

Multiplying the left- and right-hand sides of this equation by $h^T B_{adj}$, then employing equations (6), (13), and (16) and rearranging terms produces the result:

$$m_N = h^T B_{adj} n + h^T \bar{m} d_N. \tag{22}$$

Given the phase vector $\phi$, n can be computed as in equation (18) and then used to find the value of the first term in equation (22). Although the value of the second term is unknown, it is an integer multiple of $d_N$, say $pd_N$. The range of possible values for p is limited, as replacing i by N in equation (1) and using the fact that $|\sin(\theta)|$ is upper-bounded by unity shows that $$-\frac{\phi_N}{2\pi} - \frac{\xi d_N}{\lambda} < m_N < -\frac{\phi_N}{2\pi} + \frac{\xi d_N}{\lambda}. \tag{23}$$

In particular, because $$\xi \leq \lambda/2, \tag{24}$$

there is at most one value of p for which the corresponding $m_N$ satisfies this inequality and $m_N$ is given by $$m_N = \mathrm{mod}\left(c^T n + \frac{\phi_N}{2\pi} + \frac{d_N}{2}, d_N\right) - \frac{\phi_N}{2\pi} - \frac{d_N}{2}, \tag{25}$$

where the row vector $c^T$ is defined as $$c^T \stackrel{def}{=} -h^T B_{adj}. \tag{26}$$

The presence of the modulo operator in equation (25) implies that arbitrary integer multiples of $d_N$ may be added to the elements of c without altering the computed value of $m_N$. Once $m_N$ has been determined, $\phi$ can be easily found. From equation (1), $$\theta = \sin^{-1}\left\{\frac{\lambda}{\xi d_N 2\pi}(\phi_N + m_N 2\pi)\right\} \tag{27}$$

Figure 1B:
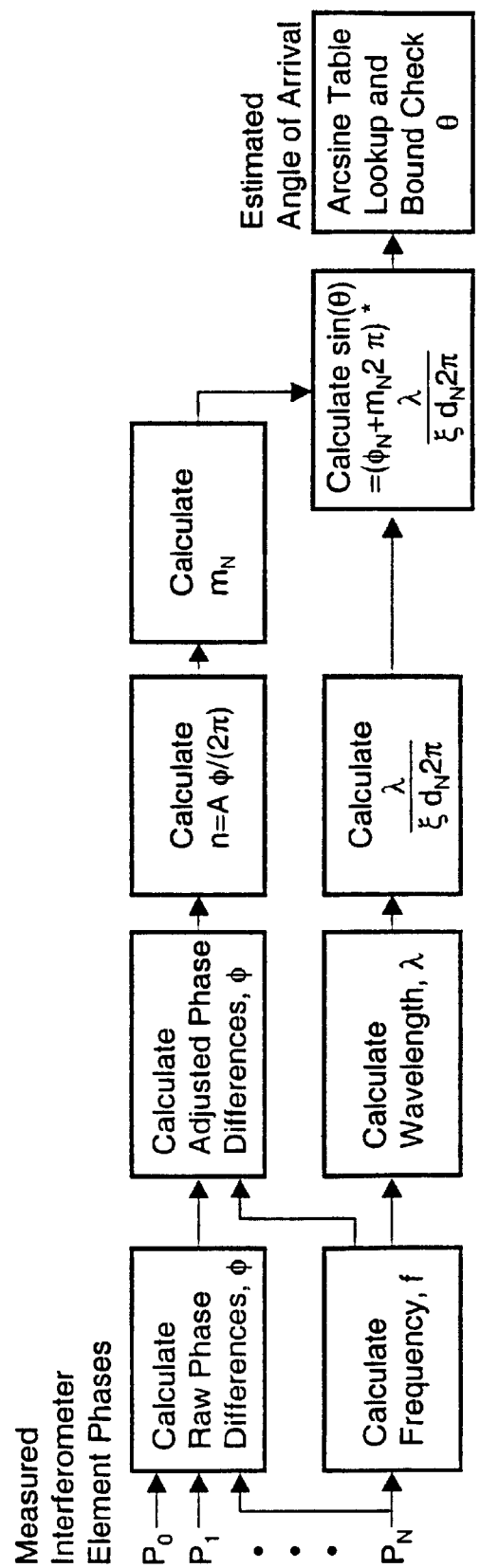
FIG. 1b is a graphical illustration of the pipelineable operations which are performed in the Diophantine algorithm.

The operations of the Diophantine algorithm are summarized in FIG. 1b. A phase measurement, $P_i$, is converted to a raw phase difference: $\phi_i=P_i-P_0$. This result may be adjusted to correct for calibration error, then augmented or decreased by $2\pi$ if needed so that the adjusted phase difference, $\phi_i$, lies within $-\pi$ and $\pi$. The roll-over, $m_N$, is then calculated as previously described. In parallel with this operation, the frequency of the signal impinging on the array is estimated by measuring the change in phase which occurs at element N over a small time interval. The change in phase divided by the length of the time interval is an estimate of the frequency in radians. Implementation of the Diophantine algorithm is largely independent of frequency, as the frequency value only appears in a single multiplication. In contrast, algorithms such as maximum likelihood might require an entire manifold of steering vectors to be recalculated when the frequency changes.

The Diophantine algorithm uses a look-up table to invert the arcsine. The result is an estimate of the angle of arrival. Note that a bound check is applied to the table input; if the input has magnitude larger than unity, a detectable ambiguity has occurred and the angle estimate is declared invalid.

In practice, a noisy version of $\phi,\bar{\phi}$, must be employed in the algorithm. Because of the noise, $$\tilde{n}^{def} = \frac{1}{2\pi} A \tilde{\phi} \qquad (28)$$

may not contain integer elements. However, simply rounding each element to the nearest integer yields a vector nint ($\hat{n}$) which can be substituted for n in equation (25). Similarly replacing $\phi_N$ by $\hat{\phi}_N$, an estimate of $m_N$, $\hat{m}_N$, is thereby obtained. If there is a difference between $m_N$ and $\hat{m}_N$, it is referred to as an ambiguity error. The ambiguity error is detectable if the estimated angle of arrival as set forth in equation (27)

$$\sin^{-1} \frac{(\hat{\phi}_N + m_N 2\pi)\lambda}{\xi 2\pi d_N}, \qquad (29)$$

is meaningless because the argument of the arcsine has magnitude exceeding unity. Otherwise, the ambiguity error is undetectable. Note that all angle of arrival estimation algorithms, including the Diophantine algorithm, can generate erroneous estimates when noise corrupts the measured data.

It is of interest to compare this algorithm with the well-known maximum likelihood and MUSIC algorithms. In the context of the Diophantine algorithm, it is assumed that only a single snapshot is available, so MUSIC and maximum likelihood are identical. Such algorithms are discussed in detail in "MUSIC, Maximum Likelihood, and Cramer-Rao Bound: Further Results and Comparisons," by P. Stoica and A. Nehorai, *IEEE Transactions on Acoustics, Speech, and Signal Processing*, pp. 2140–2150, Vol. 38, No. 12, December 1990, hereby incorporated by reference. Their estimate is whichever angle $\theta$ maximizes $|v(\theta)'x|$, where $'$ denotes the complex conjugate operator, x is a noisy snapshot containing antenna amplitude/phase measurements, and the ideal steering vector $v(\theta)$ equals $\exp\{\text{sqrt}(-1) * [0\phi_1(\theta)\phi_2(\theta) \ldots \phi_N(\theta)]\}^T$ and contains the phase shifts which would in principle be measured if $\theta$ were indeed the angle of arrival. Thus, maximum likelihood requires about 4NM real multiplications, where M is the number of angles of arrival being considered and can be several orders of magnitude larger than N. For comparison, reviewing the previously stated steps of the Diophantine algorithm shows that it requires about $N^2$ real multiplications.

Figure 2:
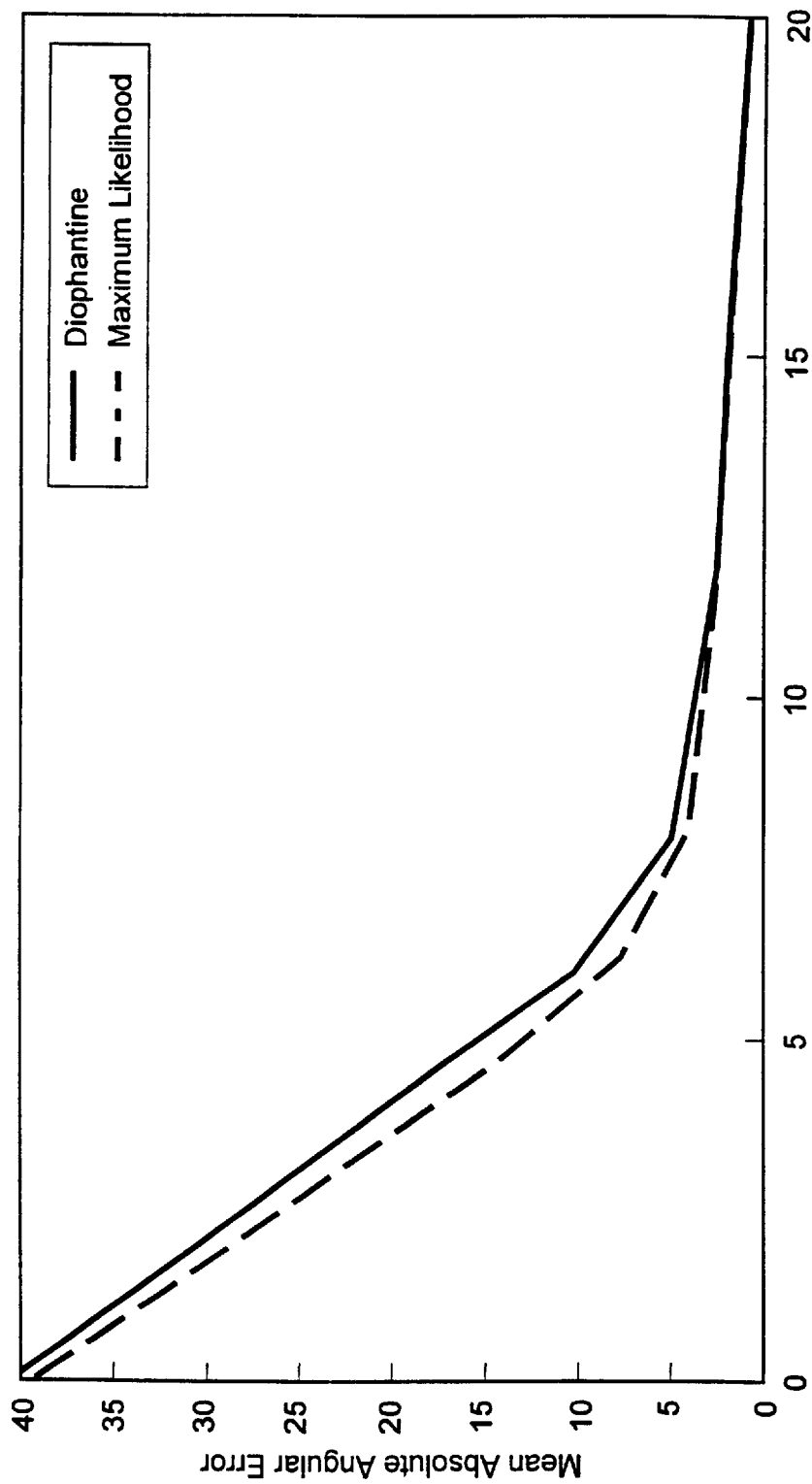
FIG. 2 is a graphical illustration of the mean absolute angular error in the angle of arrival estimate, as a function of the signal-to-noise ratio at an individual antenna. The maximum likelihood algorithm (shown dotted) is compared to the Diophantine algorithm of the present invention (shown as a solid line) for an example array in which the antenna locations are stated in the illustration.
Figure 3:
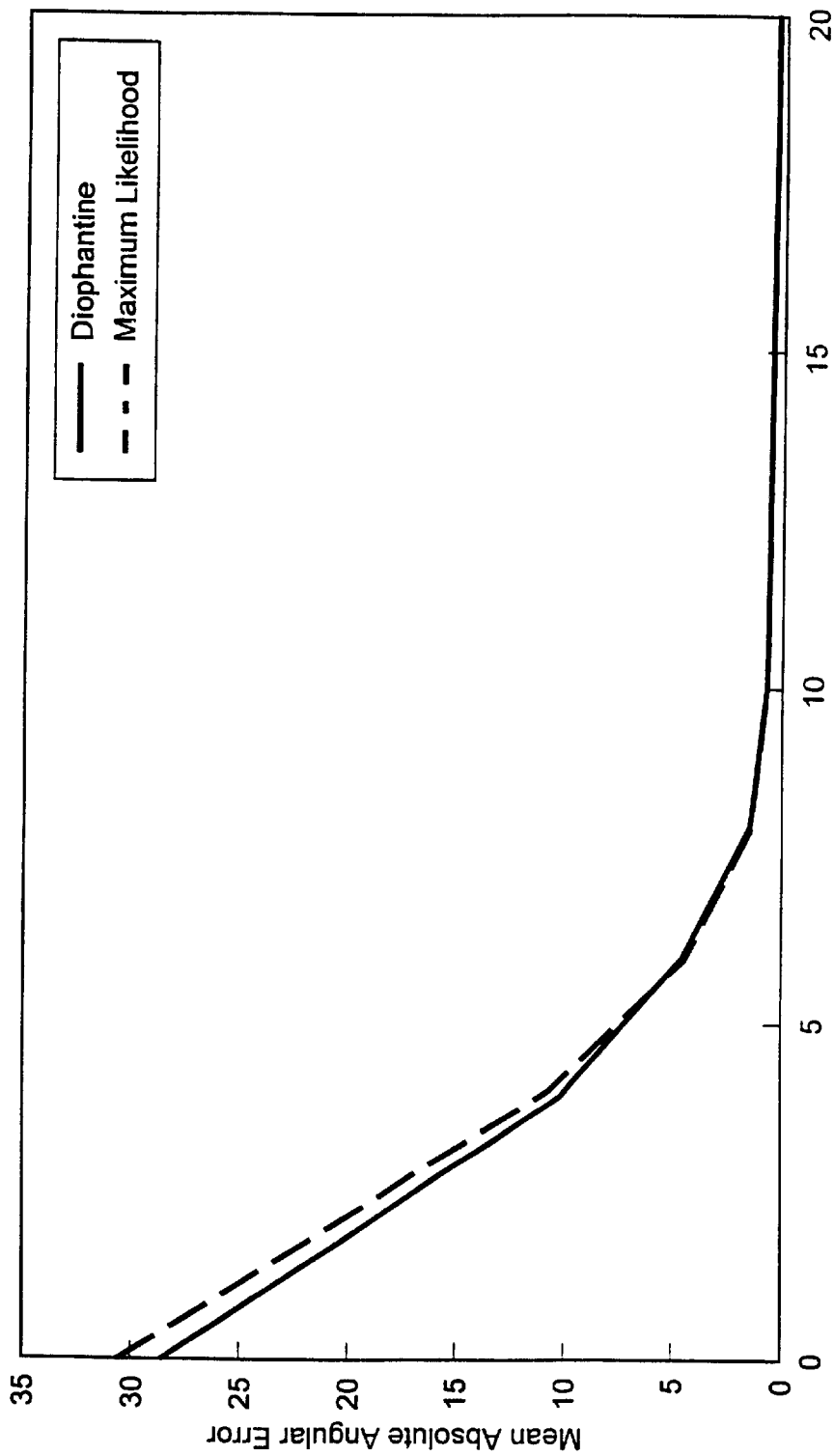
FIG. 3 is similar to FIG. 2 but for $\xi=0.25\lambda$.

The performance of the Diophantine algorithm is compared against that of maximum likelihood in the following two examples, in each of which the azimuth was selected with uniform probability over the range (–90, 90) degrees in 10,000 trials. In both examples, the matrix $$A = \begin{bmatrix} 1 & -2 & -2 & 2 \\ 3 & -2 & 1 & -1 \\ 2 & 1 & -3 & 1 \end{bmatrix} \qquad (30)$$

and $$d = [12\ 14\ 23\ 31]^T \qquad (31)$$

and $$c = [28\ 11\ 16]^T \qquad (32)$$

while $\xi = 0.5\lambda$ in the first example, illustrated in FIG. 2, and $\xi = 0.25\lambda$ in the second example, illustrated in FIG. 3. Note that the performance of the Diophantine algorithm was not averaged over trials in which a detectable ambiguity error occurred, as these errors were automatically recognized and discarded. While the maximum likelihood algorithm could also be modified to reject estimates, based on an estimate of the SNR and on the relative heights of the peaks of the "spectrum" $10 \log_{10}\{|v(\theta)'x|^2\}$, such a modification would appear ad hoc when contrasted with the straightforward rejection criterion of the Diophantine algorithm, and of course would increase the computational complexity of the maximum likelihood algorithm. In these two examples, it is worth noting that both the Diophantine algorithm and the maximum likelihood algorithm have comparable performance. However, the former algorithm requires only about 16 multiplications per simulation trial, while the latter requires (at an SNR of 20 dB) about 200 multiplications per simulation trial in the first example and about 900 in the second example to attain the maximum achievable accuracy. These large numbers of multiplications could be avoided by the maximum likelihood algorithm only by sacrificing angular estimation accuracy or by employing large, memory-intensive look-up tables.

Like all angle of arrival algorithms, the Diophantine algorithm can produce erroneous estimates when noise corrupts the measured phases. In particular, noise can cause the Diophantine algorithm to incorrectly estimate the rollover $m_N$. Such an error, which has been referred to above as an ambiguity error, will either result in an obviously meaningless estimate of the angle of arrival (in which case the ambiguity error is said to be "detectable") or a grossly inaccurate estimate (in which case the ambiguity error is said to be "undetectable"). Although not required to apply the Diophantine algorithm, it is obviously desirable to position the array elements so as to minimize the probability of making an ambiguity error. In the following, an approximate formula is derived which expresses an upper bound on the probability of ambiguity error as a function of the matrix A, which in turn must be chosen based on the element locations. This formula can be used to evaluate different array configurations and choices of the matrix A and to select from among them so as to ensure a small probability of ambiguity error. It should be understood that many of the assumptions or approximations (such as the phase errors having a Gaussian distribution) made in the derivation of the formula are not required to complete this analysis, but are merely made in order to simplify the calculations. Thus, there are many obvious extensions of this analysis.

For simplicity, it is assumed in the analysis that the true angle of arrival is 0 degrees. In this case, $\phi_N = 0$ and $m_N = 0$. An ambiguity error occurs whenever the noisy version of $\phi_N = m_N 2\pi$ differs from its noiseless value, 0, by more than $2\pi$. However, because $\hat{\phi}_N$ (the noisy version of $\phi_N$) must lie between $-\pi$ and $\pi$, it follows that an ambiguity error occurs whenever $\hat{m}_N$ differs from 0. From this observation and inspection of equations 25 and 28, an ambiguity error cannot occur unless at least one element of the vector nint ($\hat{n}$) differs from its ideal value of 0. Equivalently, the probability that an ambiguity error occurs is upper-bounded by the probability that at least one element of $$\tilde{n} = \frac{1}{2\pi} A \tilde{\phi} \qquad (33)$$

lies outside the range (–½, ½). Note that $$\Phi = \Delta\Phi - \Delta\Phi_0, \qquad (34)$$

where for $i = 1, \ldots, N$, $\Delta\phi_i$ is the noisy phase measurement at the ith antenna element and $\Delta\phi_0$ is the noisy phase measurement at the reference element. In the noiseless case, $\phi$ contains zeros. For simplicity of the analysis, it will be assumed that $\Delta\phi_0$ and the elements of $\Delta\phi$ are all zero-mean, independent and identically distributed Gaussian quantities with variance $\sigma^2$. Although this assumption conflicts with the requirement that phase values are restricted to the $(-\pi, \pi)$ interval, the discrepancy is not significant when the signal-to-noise ratio is sufficiently large so that the probability of a noisy phase measurement differing from its noiseless value of 0 by more than $\pi$ is negligible. Note that the analysis could be modified to address other phase error models.

Given the above Gaussianity assumptions, it is easy to show for i=1, ..., N and j=1, ..., N that the (i, j)th element of the covariance matrix of the Gaussian vector $\tilde{n}$ is $$E[\tilde{n}_i \tilde{n}_j] = \frac{\sigma^2}{(2\pi)^2}\left[\sum_{u=1}^{N} A_{iu}A_{ju} + \sum_{u=1}^{N}\sum_{v=1}^{N} A_{iu}A_{jv}\right] \quad (35)$$

The corresponding expression for the probability density of $\tilde{n}$ in terms of this covariance matrix is well-known (see for example Detection, Estimation, and Modulation Theory Part. I, Harry L. Van Trees, page 77, published by John Wiley & Sons). Let INT_N denote the integral of this density over the region in which all elements of $\tilde{n}$ lie in $(-\frac{1}{2}, \frac{1}{2})$. Note that INT_N can be evaluated via numerical integration. It follows that 1-INT_N is the desired formula for the upper bound on the probability of ambiguity error.

If the covariance matrix is approximated by a diagonal matrix with the same diagonal values, the N-variate integral can be expressed as the product of N separate integrals and $$1 - INT\_N = 1 - \prod_{i=1}^{N} \text{erf}\left[\pi\left(2\sigma^2\left[\sum_{u=1}^{N} A_{iu}^2 + \left(\sum_{u=1}^{N} A_{iu}\right)^2\right]\right)^{1/2}\right] \quad (36)$$

where "erf" denotes the well-known error function.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A linear interferometer for intercepting and determining the angle of arrival $\theta$ of intercepted pulses comprising:

a reference antenna;

a plurality of N antennas, colinearly aligned with said reference antenna forming a one dimensional interferometer, the spacing of said antennas relative to the reference antenna selected to be the product of a reference length $\xi$ and a baseline $d_i$, where $\{d_i, i=1$ to $N-1\}$ are prime numbers and $d_i, d_N$ are prime for i in the range $1 \leq i < N$; and means for computing the angle of arrival of intercepted pulses at said antennas, wherein said angle of arrival $\theta$ is determined as a function of the difference between the measured phase of said reference antenna and said plurality of N antennas in the array, wherein phase differences $>2\pi$ are defined as phase rollovers, said angle of arrival being determined as a function of the number of phase rollovers.

2. The linear interferometer as recited in claim 1, wherein the reference length is constrained to $\lambda/2$ or less.

3. The linear interferometer as recited in claim 1, wherein the angle of arrival $\theta$ is constrained to be $-\pi/2 \leq \theta < \pi/2$.

4. The linear interferometer as recited in claim 1, wherein the number of real multiplications to determine the angle of arrival $\theta$ is $N^2$, where N is the number of said plurality of antenna elements.

5. A linear interferometer for determining the angle of arrival $\theta$ of intercepted pulses comprising:

a reference antenna;

a plurality of N antennas; said reference antenna and said N antennas colinearly disposed and initially spaced apart as a function of a reference length and a baseline $d_i$, where $\{d_i, i=1$ to $N-1\}$ are prime numbers, and subsequently spaced apart to optimize the reduction of the probability of ambiguity on subsequent angle of arrival measurements; and means for computing the angle of arrival of intercepted pulses as a function of the difference between the measured phase of said reference antenna and said plurality of N antennas in said array, wherein phase differences greater than $2\pi$ are defined as phase rollovers, said angle of arrival being determined as a function of the number of phase rollovers.

6. The linear interferometer as recited in claim 5, wherein said angle of arrival $\theta$ is a function of phase shift $\phi_i$ at each of the antennas and phase rollovers $m_i$ wherein errors in the rollover $m_i$ result in ambiguity errors in the angle of arrival $\theta$.

7. The linear interferometer as recited in claim 6, wherein the phase roll-over $m_N$ is a function of $A\phi/2\pi$, where the $\phi$ is the phase shift, and A is a matrix, where $Ad=0$, where the ith element of d, i=1, ..., N, is $d_i$.

8. The linear interferometer as recited in claim 7, wherein the quantity $A\phi/2\pi$ is rounded to the nearest integer value.

9. A method for estimating the angle of arrival of an intercepted pulse comprising the steps of:

(a) providing a linear array of antenna elements wherein N+1 denotes the number of elements including a reference antenna;

(b) locating said antenna elements at coordinates 0, $\xi$ $d_i$, ..., $\xi$ $d_N$, wherein $\xi$ is a reference length not exceeding a half-wavelength $(\lambda/2)$ at the highest frequency at which the system is to be operated and $d_i$ is an integer for all i and the N-1 numbers $\{d_1, d_2, ..., d_{N-1}\}$ are prime numbers and $\{d_i, d_N\}$ are prime for i in the range $1 \leq i < N$ and wherein an N-1 by N matrix A with integer values and a vector c with integer values exist such that the calculations:

$$\tilde{n} = \frac{1}{2\pi}A\tilde{\phi}$$

(where nint denotes the nearest integer operator) will generally result in an accurate estimate $\theta$ of the true angle of arrival $\theta$ when for i=1, ..., N, the ith element of the vector $\phi$ contains the difference between the measured phase at the ith array antenna and the measured phase at the reference antenna.

10. The method as recited in claim 9, wherein said antenna elements are positioned so as to approximately minimize the probability of noise causing an ambiguity error, as a function of:

$$1 - \prod_{i=1}^{N} \text{erf}\left[\pi\left(2\sigma^2\left[\sum_{u=1}^{N} A_{iu}^2 + \left(\sum_{u=1}^{N} A_{iu}\right)^2\right]\right)^{-1/2}\right],$$

where "erf" denotes an error function.

* * * * *